United States Patent
Lee et al.

(10) Patent No.: US 8,004,635 B2
(45) Date of Patent: Aug. 23, 2011

(54) DISPLAY SUBSTRATE, DISPLAY PANEL HAVING THE SAME, AND METHOD OF MANUFACTURING THE SAME

(75) Inventors: Yun-Seok Lee, Cheonan-si (KR); Young-Je Cho, Cheonan-si (KR); Byung-Hyun Kim, Asan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/726,966

(22) Filed: Mar. 18, 2010

(65) Prior Publication Data
US 2010/0188624 A1 Jul. 29, 2010

Related U.S. Application Data

(62) Division of application No. 11/764,520, filed on Jun. 18, 2007, now abandoned.

(30) Foreign Application Priority Data

Jun. 19, 2006 (KR) ................... 2006-54706

(51) Int. Cl.
*G02F 1/1335* (2006.01)
*G02F 1/1333* (2006.01)
(52) U.S. Cl. ........................ 349/106; 349/110
(58) Field of Classification Search .......... None
See application file for complete search history.

(56) References Cited

U.S. PATENT DOCUMENTS

| 5,910,829 | A | 6/1999 | Shimada et al. |
| 6,025,899 | A | 2/2000 | Fukunaga et al. |
| 6,671,025 | B1 | 12/2003 | Ikeda et al. |
| 7,187,426 | B2 * | 3/2007 | Kaneko et al. ............... 349/149 |

FOREIGN PATENT DOCUMENTS
KR  1020050116032  12/2005

OTHER PUBLICATIONS

Non-Final Office Action issued Jul. 6, 2009 in U.S. Appl. No. 11/764,520.
Final Office Action issued Jan. 13, 2010 in U.S. Appl. No. 11/764,520.

* cited by examiner

*Primary Examiner* — Omar Rojas
(74) *Attorney, Agent, or Firm* — H.C. Park & Associates, PLC

(57) ABSTRACT

A base substrate of a color filter substrate includes a display region and a peripheral region. The display region includes a pixel area having a first unit area, a second unit area, and a third unit area that are disposed adjacent to each other, and a blocking area that surrounds peripheral portions of each of the first, second, and third unit areas. A first color filter is formed in the first unit area. A second color filter is formed in the second unit area and the blocking area. A third color filter is formed in the third unit area and on the second color filter in the blocking area. Therefore, the second and third color filters overlap each other so that light is blocked.

10 Claims, 15 Drawing Sheets

DISPLAY SUBSTRATE, DISPLAY PANEL HAVING THE SAME, AND METHOD OF MANUFACTURING THE SAME

CROSS-REFERENCE TO RELATED APPLICATION

This application is a divisional of U.S. patent application Ser. No. 11/764,520 filed Jun. 18, 2007 and claims priority from and the benefit of Korean Patent Application No. 2006-54706, filed on Jun. 19, 2006, which are all hereby incorporated by reference for all purposes as if fully set forth herein.

BACKGROUND OF THE INVENTION

1. Field of the Invention

The present invention relates to a display substrate, a display panel including the display substrate, and a method of manufacturing the display substrate. More particularly, the present invention relates to a display substrate which may be made by a simplified is manufacturing process, a display panel including the display substrate, and the method of manufacturing the display substrate.

2. Discussion of the Background

A liquid crystal display (LCD) device includes a liquid crystal display panel that displays images by using light transmittance of liquid crystal molecules and a backlight assembly disposed below the LCD panel to provide the LCD panel with light.

The LCD panel includes an array substrate having a thin-film transistor (TFT) formed thereon, a color filter substrate having a color filter formed thereon to face the array substrate, and a liquid crystal layer interposed between the array substrate and the color filter substrate.

The color filter substrate may include a base substrate, a light-blocking layer formed on the base substrate, a color filter formed to cover the light-blocking layer, an overcoating layer formed on the color filter, and a common electrode formed on the overcoating layer. The light-blocking layer is formed in a light-blocking area of the base substrate.

A method of manufacturing the color filter substrate will be described. The light-blocking layer is formed on the base substrate and then the color filter is formed to cover the light-blocking layer. Next, the overcoating layer is formed on an upper portion of the color filter and finally, the common electrode is formed on the overcoating layer.

However, when the color filter substrate is formed with a plurality of elements, the number of manufacturing process steps required to manufacture the color filter substrate may increase.

SUMMARY OF THE INVENTION

The present invention provides a display substrate that may be made by a simplified manufacturing process.

The present invention also provides a display panel including the above-mentioned display substrate.

The present invention also provides a method of manufacturing the above-mentioned display substrate.

Additional features of the invention will be set forth in the description which follows, and in part will be apparent from the description, or may be learned by practice of the invention.

The present invention discloses a display substrate including a base substrate, a first color filter, a second color filter, and a third color filter.

The base substrate includes a display region and a peripheral region surrounding the display region. The display region includes a pixel area having a first unit area, a second unit area, and a third unit area that are disposed adjacent to each other, and a blocking area that surrounds peripheral portions of each of the first unit area, the second unit area, and the third unit area. The first color filter is disposed in the first unit area. The second color filter is disposed in the second unit area and the blocking area. The third color filter is disposed in the third unit area and on the second color filter in the blocking area.

The present invention also discloses a display substrate including a base substrate, a first color filter, a second color filter, and a third color filter. The base substrate includes a light-transmitting region and a light-blocking region. The first color filter is disposed in the light-blocking region. The second color filter is disposed on the first color filter in the light-blocking region. One of the first color filter and the second color filter is a blue color filter and the other of the first color filter and the second color filter is a red color filter.

The present invention also discloses a display panel including a color filter substrate, an array substrate, and a liquid crystal layer. The color filter substrate includes a base substrate, a first color filter, a second color filter, and a third color filter. The base substrate includes a display region and a peripheral region surrounding the display region. The display region includes a pixel area having a first unit area, a second unit area, and a third unit area that are disposed adjacent to each other, and a blocking area that surrounds peripheral portions of each of the first unit area, the second unit area, and the third unit area. The first color filter is disposed in the first unit area. The second color filter is disposed in the second unit area and the blocking area. The third color filter is disposed in the third unit area and on the second color filter in the blocking area. The array substrate is disposed to face the color filter substrate, and the array substrate includes a plurality of thin-film transistors (TFTs) and a plurality of pixel electrodes connected to the TFTs. The liquid crystal layer is interposed between the array substrate and the color filter.

The present invention also discloses a display panel including a first substrate, a second substrate, and a liquid crystal layer. The second substrate faces the first substrate. The second substrate includes a base substrate, a plurality of thin-film transistors (TFTs), a plurality of pixel electrodes, a first color filter, a second color filter, and a third color filter. The base substrate includes a display region and a peripheral region surrounding the display region. The display region includes a pixel area having a first unit area, a second unit area, and a third unit area that are disposed adjacent to each other, and a blocking area that surrounds each of the first to third unit areas. The TFTs are respectively disposed in each of the first to third pixel areas. The pixel electrodes are electrically connected to the TFTs, respectively. The first color filter is disposed in the first unit area and the blocking area. The second color filter is disposed in the second unit area. The third color filter is disposed in the third unit area and on the first color filter in the blocking area.

The present invention also discloses a method for manufacturing a display substrate including preparing a base substrate, forming a first color filter, forming a second color filter, and forming a third color filter. The display substrate includes a display region and a peripheral region surrounding the display region. The display region includes a pixel area having a first unit area, a second unit area, and a third unit area that are disposed adjacent to each other, and a blocking area that surrounds peripheral portions of each of the first unit area, the second, unit area, and the third unit area. The first color filter is formed in the first unit area. The second color filter is formed in the second unit area and the blocking area. The third color filter is formed in the third unit area and on the second color filter in the blocking area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
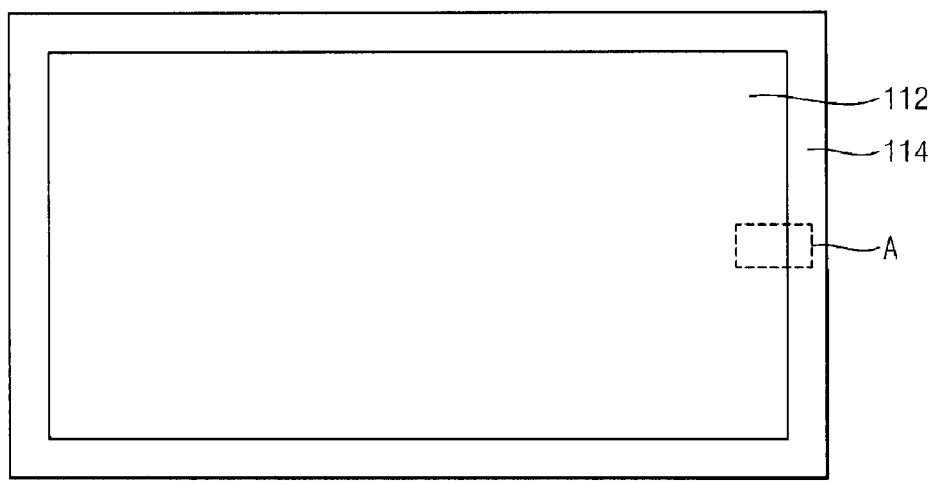
FIG. 1 is a plan view showing a color filter substrate of a display panel according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
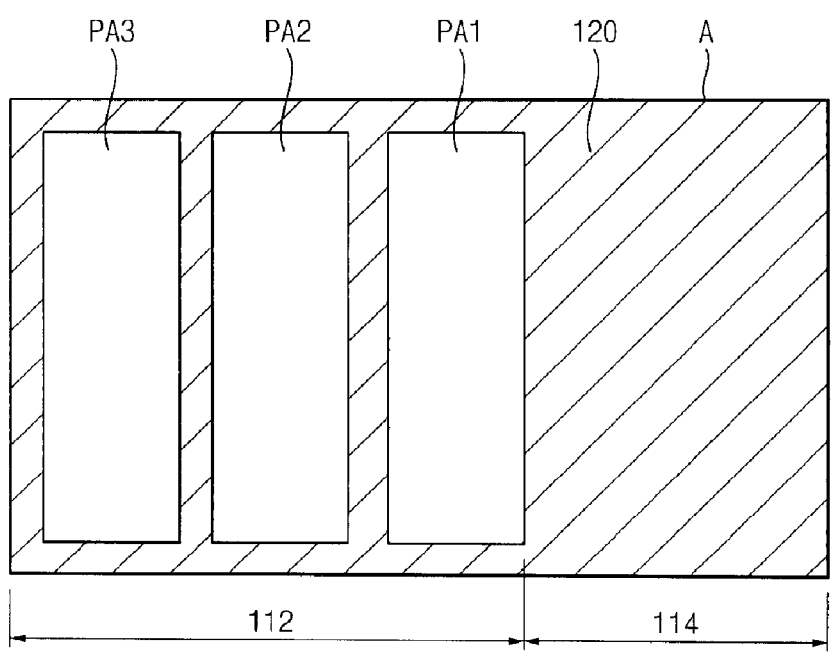
FIG. 2 is an enlarged plan view showing portion 'A' in FIG. 1.
Figure 3:
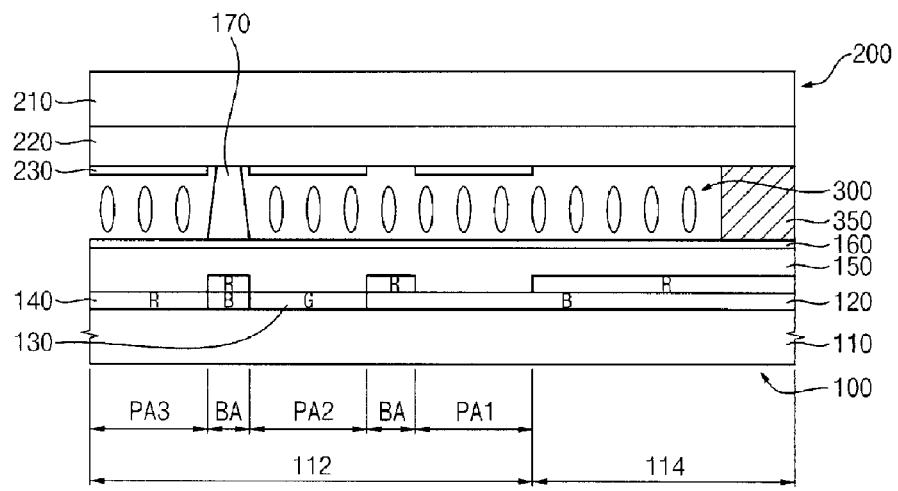
FIG. 3 is a cross-sectional view showing a portion of a display panel according to an exemplary embodiment of the present invention.

FIG. 1 is a plan view showing a color filter substrate of a display panel according to an exemplary embodiment of the present invention. FIG. 2 is an enlarged plan view showing portion 'A' in FIG. 1. FIG. 3 is a cross-sectional view showing a portion of a display panel according to an exemplary embodiment of the present invention.

Referring to FIGS. 1, 2, and 3, a display panel according to an exemplary embodiment of the present invention includes a color filter substrate 100, an array substrate 200, a liquid crystal layer 300, and a sealing member 350.

The color filter substrate 100 includes a first base substrate 110, a first color filter 120, a second color filter 130, a third color filter 140, an overcoating layer 150, a common electrode 160, and a spacer 170.

The first base substrate 110 has a flat shape and includes a transparent material. Examples of the transparent material include glass, quartz, and plastic.

The first base substrate 110 is divided into a display region 112 and a peripheral region 114 surrounding the display region 112. An image is displayed in the display region 112, but the image is not displayed in the peripheral region 114. The display region 112 includes a pixel area PA having a first unit area PA1, a second unit area PA2, and a third unit area PA3 that are disposed adjacent to each other and a blocking area BA surrounds peripheral portions of each of the first, second, and third unit areas PA1, PA2, and PA3.

A plurality of the pixel areas PA are disposed in a matrix shape. Each of the first, second, and third unit areas PA1, PA2, and PA3 has a substantially rectangular shape when viewed from a plan view of the display panel.

The first color filter 120 is formed in the first unit area PA1 and the blocking area BA of the pixel area PA. The second color filter 130 is formed in the second unit area PA2 of the pixel area PA. The third color filter 140 is formed in the third unit area PA3 and on the first color filter 120 in the blocking area BA of the pixel area PA.

Moreover, the first color filter 120 may be further formed in a peripheral region 114, and the third color filter 140 may be further formed on the first color filter 120 in the peripheral region 114.

The second color filter 130 may be a green color filter, one of the first and third color filters 120 and 140 may be a blue color filter, and the other color filter may be a red color filter. For example, as FIG. 3 shows, the first color filter 120 may be a blue color filter, and the third color filter 140 may be a red color filter.

As described above, when the first and third color filters 120 and 140 are formed in the blocking area BA and the peripheral region 114, light may be blocked in the blocking area BA and the peripheral region 114. Particularly, when one of the first and third color filters 120 and 140 is a blue color filter and the other one of the first and third color filters 120 and 140 is a red color filter, light may be blocked effectively.

A blue color filter generally transmits visible light having a wavelength in the range of about 380 nm to about 550 nm and absorbs visible light having wavelengths outside of this range. A red color filter generally transmits visible light having a wavelength in the range of about 580 nm to about 780 nm and absorbs visible light having wavelengths outside of this range. Therefore, when the blue color filter and the red color filter overlap each other, substantially all visible light is absorbed by the blue and red color filters. For example, when the blue color filter and red color filter overlap each other, only about 0.04% of visible light is transmitted and the remaining wavelengths of the visible light are absorbed.

The overcoating layer 150 is formed on the first base substrate 110 to cover the first, second, and third color filters 120, 130, and 140. For example, the overcoating layer 150 protects the first, second, and third color filters 120, 130, and 140 by covering the first, second, and third color filters 120, 130, and 140 and planarizes an upper surface on the first, second, and third color filters 120, 130, and 140.

The common electrode 160 is formed on the overcoating layer 150. The common electrode 160 may include an optically transparent and electrically conductive material, such as indium tin oxide (ITO), indium zinc oxide (IZO), or amorphous indium tin oxide (a-ITO).

The spacer 170 is formed on the common electrode 160 to maintain a cell gap between the color filter substrate 100 and the array substrate 200. The spacer 170 is formed in a position that corresponds to a portion of the blocking area BA of the display region 112. The spacer 170 may include an organic material.

The array substrate 200 is disposed to face the color filter substrate 100 and includes a second substrate 210, a gate line (not shown), a data line (not shown), a thin-film transistor (TFT) (not shown), a protection layer 220, and a pixel electrode 230.

The second base substrate 210 has a flat shape and includes a transparent material. Examples of the transparent material include glass, quartz, and plastic.

The gate line and the data line are formed on the second base substrate 210 and cross each other. The gate and data lines may be formed in a position that corresponds to the blocking area BA of the display region 112.

The TFT is connected to the gate line and the data line and is also connected to the pixel electrode 230. The TFT receives a gate signal and a data signal from the gate line and the data line, respectively, and applies a driving voltage to the pixel electrode 230.

The protection layer 220 is formed on the gate and data lines and the TFT to protect the gate and data lines and the TFT.

The pixel electrode 230 is formed in a portion that corresponds to the pixel area PA of the display region 112. That is, the pixel electrode 230 is formed in a portion that corresponds to each of the first, second, and third unit areas PA1, PA2, and PA3.

The pixel electrode 230 includes an optically transparent and electrically conductive material such as ITO, IZO, or a-ITO.

The pixel electrode 230 is connected to the TFT through a contact hole (not shown) that is formed in the protection layer 220. The pixel electrode 230 charges the driving voltage provided by the TFT and generates an electric field between the pixel electrode 230 and the common electrode 160.

The liquid crystal layer 300 is interposed between the color filter substrate 100 and the array substrate 200. The liquid crystal layer 300 has an anisotropy of refractive index and a dielectric coefficient. When electric fields are applied to the liquid crystal layer 300, the arrangement of the liquid crystal molecules is altered, allowing for optical transmittance through the liquid crystal layer 300 to be controlled so that an image may be displayed.

The sealing member 350 is formed at a portion of the peripheral region 114 to couple the color filter substrate 100 to the array substrate 200. Thus, an outflow of liquid crystal molecules of the liquid crystal layer 300 may be prevented.

According to the present exemplary embodiment, the first and third color filters 120 and 140 overlap each other in the blocking area BA of the display region and the peripheral region 114, blocking light in those regions. Thus, an additional light-blocking layer for blocking light may be omitted, which may simplify the manufacturing process of the color filter substrate.

The color filter substrate 100 may include a first base substrate 110, a first blocking color filter 120, and a second blocking color filter 140.

The first base substrate 110 may be divided into a light-transmitting area that transmits light and a light-blocking area that blocks light. For example, the light-transmitting area may be a pixel area PA having a first unit area PA1, a second unit area PA2, and a third unit area PA3. The light-blocking area may include only a blocking area BA or may include a blocking area BA and a peripheral region 114.

The first blocking color filter 120 may be formed in the light-blocking area and the second blocking color filter 140 may be formed on the first blocking color filter 120 in the light-blocking area. Here, one of the first and second blocking color filters 120 and 140 may be a blue color filter and the other may be a red color filter.

Accordingly, the first and second color filters 120 and 140 overlap each other in the light-blocking area so that light is blocked.

Alternatively, the overlapping color filters, as described above, may also be used for a color filter on array (COA) type display panel, which includes an array substrate having color filters formed thereon and an opposite substrate that faces the array substrate.

Figure 4:
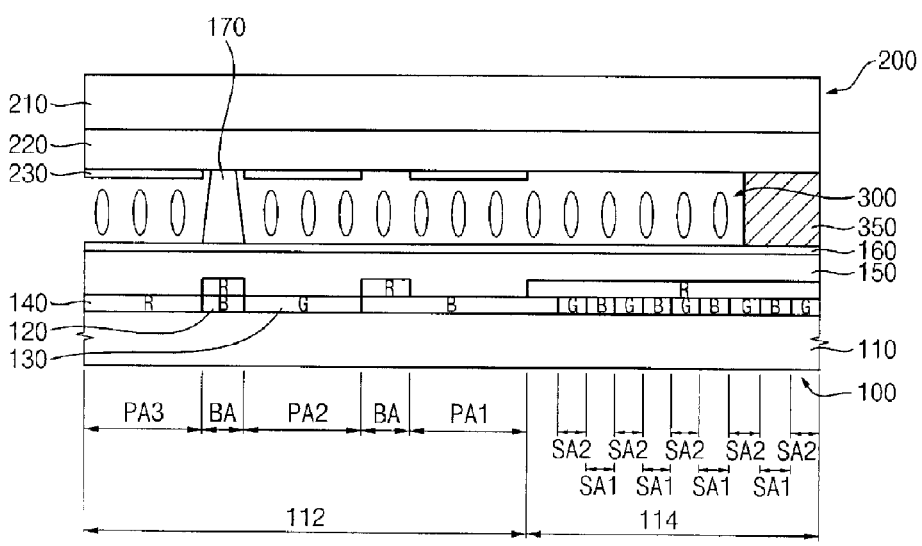
FIG. 4 is a cross-sectional view showing a portion of a display panel according to another exemplary embodiment of the present invention.

FIG. 4 is a cross-sectional view showing a portion of a display panel according to another exemplary embodiment of the present invention. The display panel according to the present embodiment is substantially the same as the display panel described above, except with regard to the color filter substrate. Thus, the same reference numerals will be used to refer to the same or like parts as those described in FIGS. 1, 2, and 3 and any further explanation concerning the above elements will be omitted.

Referring to FIG. 4, a color filter substrate 100 includes a first base substrate 110, a first color filter 120, a second color filter 130, a third color filter 140, an overcoating layer 150, a common electrode 160, and a spacer 170.

The first base substrate 110 is divided into a display region 112 and a peripheral region 114 surrounding the display region 112. The display region 112 includes a pixel area PA having a first unit area PA1, a second unit area PA2, and a third unit area PA3. The first, second, and third unit areas PA1, PA2, and PA3 are disposed adjacent to each other, and a blocking area BA surrounds peripheral portions of each of the first, second, and third unit areas PA1, PA2, and PA3. The peripheral region 114 includes a first sub-area SA1 and a second sub-area SA2 that are disposed adjacent to each other.

The first and second sub-areas SA1 and SA2 may be alternately arranged along a first direction and alternately arranged along a second direction substantially perpendicular to the first direction. That is, the first and second sub-areas SA1 and SA2 may be arranged in a checkerboard pattern. Alternatively, the first and second sub-areas SA1 and SA2 may be arranged in alternating columns.

The first color filter 120 is formed in the first unit area PA1 of the pixel area PA and the blocking area BA. The second color filter 130 is formed in the second unit area PA2 of the pixel area PA. The third color filter 140 is formed in the third unit area PA3 of the pixel area PA and on the first color filter 120 in the blocking area BA.

The first color filter 120 may be further formed in a peripheral region 114 and the third color filter 140 may be further formed on the first color filter 120 in the peripheral region 114. More specifically, the first color filter 120 may be further formed in the first sub-area SA1, and the second color filter 130 may be further formed in the second sub-area SA2. The third color filter 140 may be further formed on the first and second color filters 120 and 130 that are formed in the peripheral region 114.

The second color filter 130 may be a green color filter. One of the first and third color filters 120 and 140 may be a blue color filter and the other may be a red color filter. For example, as FIG. 4 shows, the first color filter 120 may be a blue color filter and the third color filter 140 may be a red color filter.

The overcoating layer 150 is formed on the base substrate 110 to cover the first, second, and third color filters 120, 130, and 140. The common electrode 160 is formed on the overcoating layer 150. The common electrode 160 may include an optically transparent and electrically conductive material. The spacer 170 is formed on the common electrode 160 to maintain a cell gap between the color filter substrate 100 and the array substrate 200.

According to the present exemplary embodiment, the first and third color filters 120 and 140 overlap in the blocking area BA of the display region 112, so that light may be blocked in the blocking area BA.

The first and second color filters 120 and 130 are alternately arranged in the peripheral region 114 and the third color filter 140 is formed on the first and second color filters 120 and 130. Thus, when external light is reflected in the peripheral region 114, the reflected light may have a mixed color caused by the combination of light reflected by the first and third color filters 120 and 140 and light reflected by the second and third color filters 130 and 140.

When external light is reflected in the peripheral region 114, the reflected light of the first exemplary embodiment, shown in FIG. 3, may include blue light due to the first color filter 120. However, the reflected light of the second exemplary embodiment, shown in FIG. 4, may include mixed light. The mixed light includes a mixture of the blue light and the green light due to the first and second color filters 120 and 130. That is, blue light and green light are mixed, causing the reflected light to have some mixed color in the second exemplary embodiment. As a result, it may be possible to prevent a blue color from being displayed in the peripheral region 114.

Figure 5:
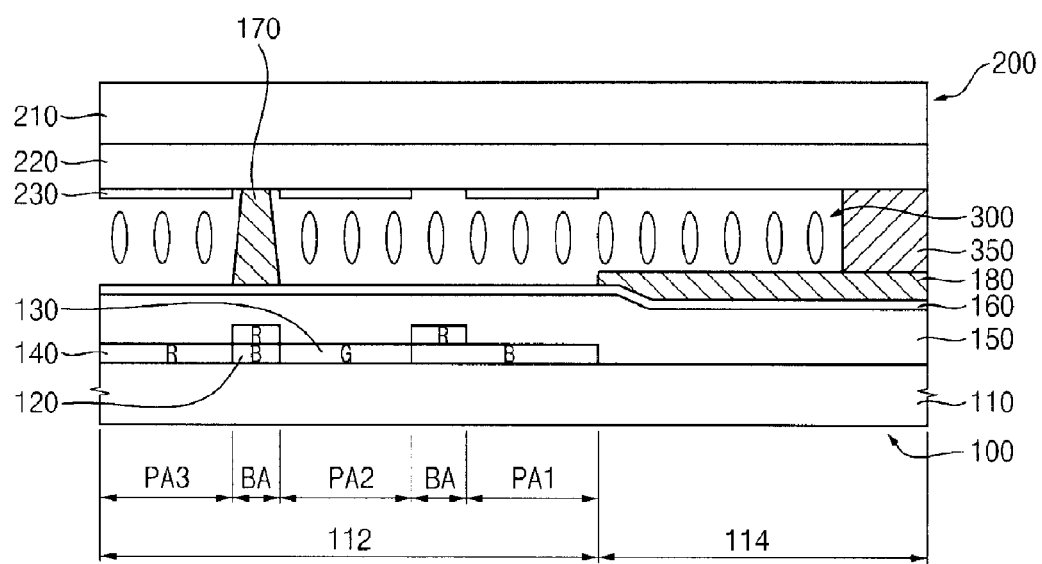
FIG. 5 is a cross-sectional view showing a portion of a display panel according to still another exemplary embodiment of the present invention.

FIG. 5 is a cross-sectional view showing a portion of a display panel according to still another exemplary embodiment of the present invention. The display panel according to the exemplary embodiment is substantially the same as the display panel as described with regard to FIGS. 1, 2, and 3, except for the color filter substrate. Thus, the same reference numerals will be used to refer to the same or like parts as those described in FIGS. 1, 2, and 3 and any further explanation concerning the above elements will be omitted.

Referring to FIG. 5, a color filter substrate 100 includes a first base substrate 110, a first color filter 120, a second color filter 130, a third color filter 140, an overcoating layer 150, a common electrode 160, a spacer 170, and a peripheral-region-blocking member 180.

The first base substrate 110 is divided into a display region 112 for displaying an image and a peripheral region 114 surrounding the display region 112. The display region 112 includes a pixel area PA having a first unit area PA1, a second unit area PA2, and a third unit area PA3 that are disposed adjacent to each other, and a blocking area BA that surrounds peripheral portions of each of the first, second, and third unit areas PA1, PA2, and PA3.

The first color filter 120 is formed in a first unit area PA1 of the pixel area PA and the blocking area BA. The second color filter 130 is formed in a second unit area PA2 of the pixel area PA. The third color filter 140 is formed in a third unit area PA3 of the pixel area PA and on the first color filter 120 in the blocking area BA. The second color filter 130 may be a green color filter. One of the first and third color filters 120 and 140 may be a blue color filter and the other may be a red color filter. For example, as FIG. 5 shows, the first color filter 120 may be a blue color filter and the third color filter 140 may be a red color filter.

The overcoating layer 150 is formed on the base substrate 110 to cover the first, second, and third color filters 120, 130, and 140.

The common electrode 160 is formed on the overcoating layer 150. The common electrode 160 may include an optically transparent and electrically conductive material.

The spacer 170 is formed on the common electrode 160 to maintain a cell gap between the color filter substrate 100 and the array substrate 200. The spacer 170 is formed in a position that corresponds to a portion of the blocking area BA of the display region 112.

The peripheral-region-blocking member 180 is formed on the common electrode 160 to correspond to the peripheral region 114. The peripheral-region-blocking member 180 may include a material that blocks light, such as a black organic material. In addition, the spacer 170 may include the same material as that of the peripheral-region-blocking member 180.

According to the present exemplary embodiment, the first and third color filters 120 and 140 are formed in the blocking area BA of the display region 112 to overlap each other, so that light may be blocked.

Moreover, the peripheral-region-blocking member 180 including a material that blocks light is formed in a position that corresponds to the peripheral region 114, so that movement of light toward the peripheral region 114 may also be blocked.

FIGS. 6A, 7A, 8A, 9, and 10 are cross-sectional views showing a method of manufacturing a color filter substrate according to an exemplary embodiment of the present invention. FIGS. 6B, 7B, and 8B are plan views showing a method of manufacturing a color filter substrate according to an exemplary embodiment of the present invention. Hereinafter, the method of manufacturing a color filter substrate in accordance with the present exemplary embodiment will be described in detail with reference to the accompanying drawings.

Figure 6A:
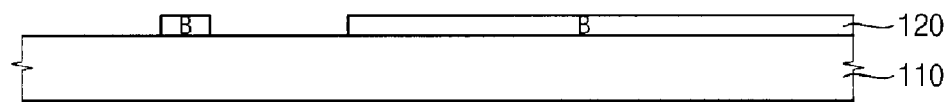
FIGS. 6A, 7A, 8A, 9, and 10 are cross-sectional views showing a method of manufacturing a color filter substrate according to an exemplary embodiment of the present invention.
Figure 6B:
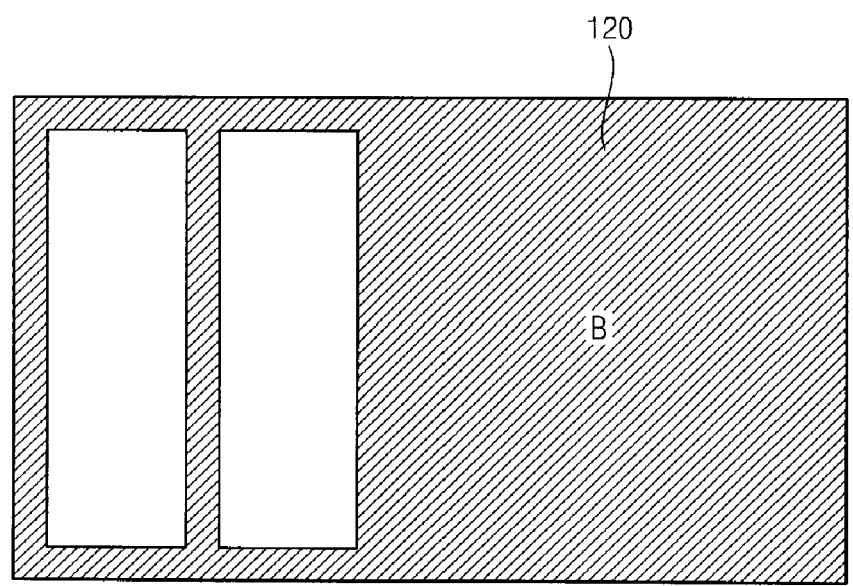
FIGS. 6B, 7B, and 8B are plan views showing a method of manufacturing a color filter substrate according to an exemplary embodiment of the present invention.

FIG. 6A is a cross-sectional view showing a step of forming a first color filter on a base substrate, and FIG. 6B is a plan view showing a position in which the first color filter is formed.

Referring to FIGS. 3, 6A, and 6B, a base substrate 110 having a flat shape is prepared. The base substrate 110 includes a display region 112 for displaying an image and a peripheral region 114 that surrounds the peripheral portion of the display region 112. The display region 112 includes a pixel area PA and a blocking area BA. The pixel area PA includes a first unit area PA1, a second unit area PA2, and a third unit area PA3 that are spaced apart from each other. The blocking area BA surrounds peripheral portions of each of the first, second, and third unit areas PA1, PA2, and PA3.

Then, a first color filter 120 is formed on the base substrate 110. The first color filter 120 is formed in the first unit area PA1 of the pixel area PA and the blocking area BA, and is further formed in the peripheral region 114. For example, the first color filter 120 may be patterned via a photolithography process. The first color filter 120 may be a blue color filter or a red color filter.

Figure 7A:
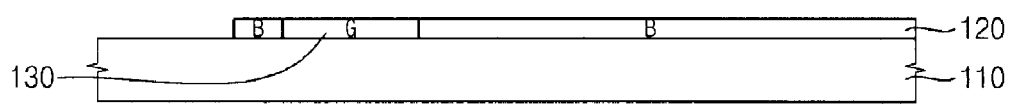
Figure 7B:
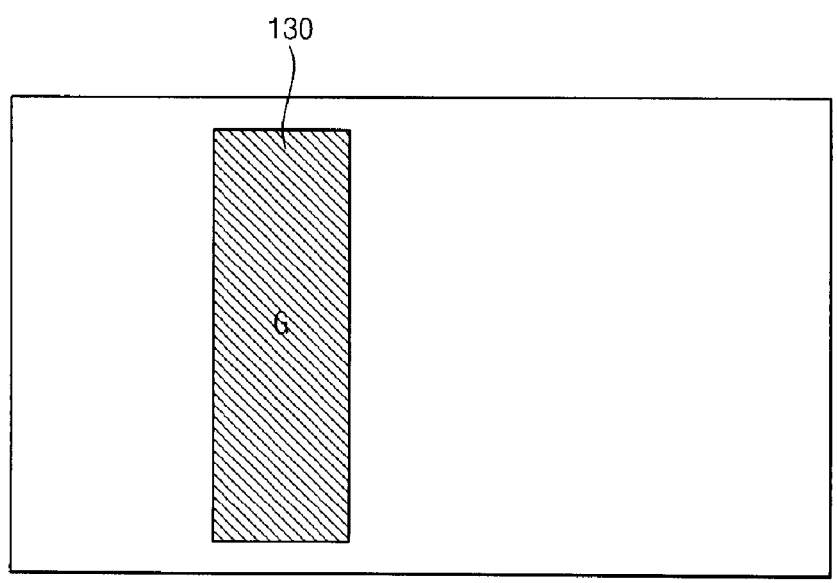

FIG. 7A is a cross-sectional view showing a method of manufacturing a second color filter on a base substrate, and FIG. 7B is a plan view showing the position of the second color filter.

Referring to FIGS. 3, 7A, and 7B, the second color filter 130 is formed on the base substrate 110. The second color filter 130 is formed in the second unit area PA2 of the pixel area PA. For example, the second color filter 130 may be patterned via a photolithography process. The second color filter 130 may be a green color filter.

Figure 8A:
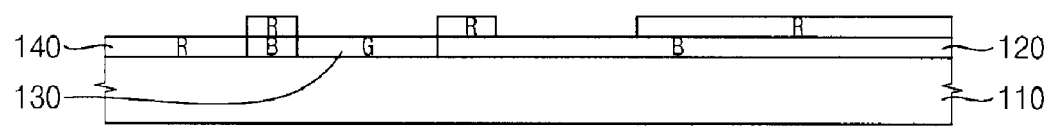
Figure 8B:
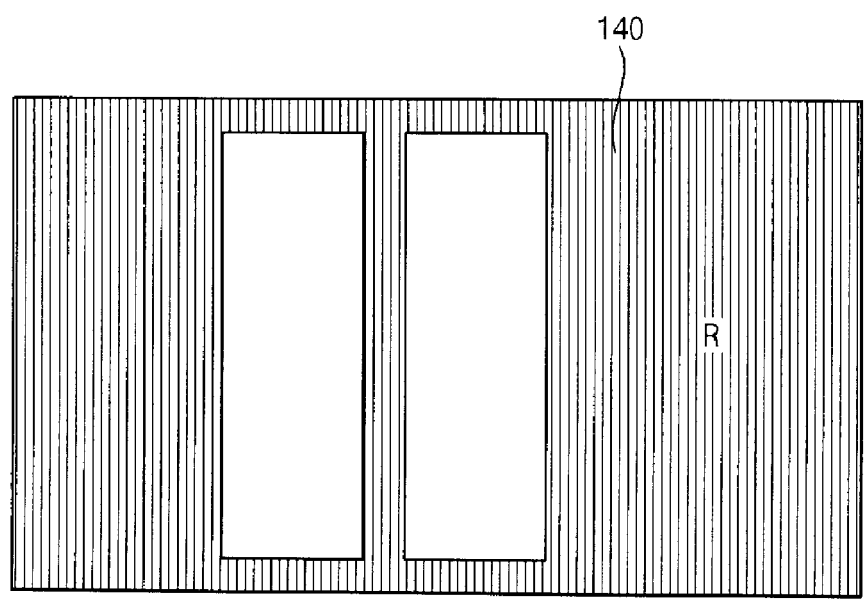

FIG. 8A is a cross-sectional view showing a method of manufacturing a third color filter on a base substrate and a first color filter, and FIG. 8B is a plan view showing the position of the third color filter.

Referring to FIGS. 3, 8A, and 8B, a third color filter 140 is formed on the base substrate 110 and on the first color filter 120. Particularly, the third color filter 140 is formed in the third unit area PA3 of the pixel area PA and on the first color filter 120 in the blocking area BA. Moreover, the third color filter 140 is formed on the first color filter 120 in the peripheral region 114. For example, the third color filter 140 may be patterned via a photolithography process. When the first color filter 120 is a blue color filter, the third color filter 140 may be a red color filter. Alternatively, when the first color filter 120 is a red color filter, the third color filter 140 may be a blue color filter.

Figure 9:
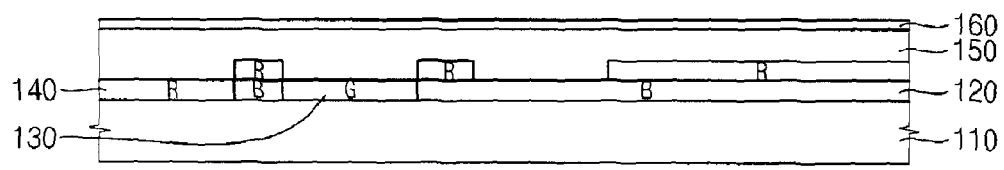

FIG. 9 is a cross-sectional view showing a method of manufacturing an overcoating layer and a common electrode.

Referring to FIG. 9, an overcoating layer 150 is formed on the first base substrate 110 to cover the first, second, and third color filters 120, 130, and 140. The overcoating layer 150 may include an organic material. The overcoating layer 150 covers the first, second, and third color filters 120, 130, and 140 to planarize an upper surface on the first, second, and third color filters 120, 130, and 140.

Then, the common electrode 160 is formed on the overcoating layer 150. The common electrode 160 may include an optically transparent and electrically conductive material such ITO, IZO, or a-ITO. The common electrode 160 may be formed by a chemical vapor deposition (CVD) process or a sputtering process.

Figure 10:
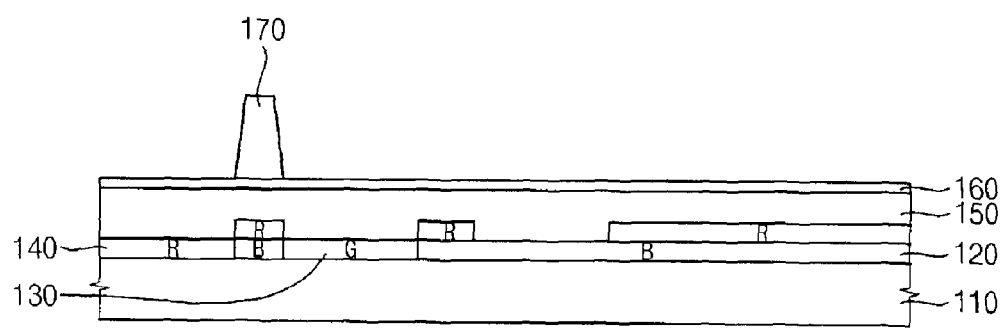

FIG. 10 is a cross-sectional view showing a method of manufacturing a spacer on a common electrode.

Referring to FIGS. 3 and 10, the spacer 170 is formed on the common electrode 160. The spacer 170 is formed at a position that corresponds to a portion of the blocking area BA. The spacer 170 may include an organic material and may be patterned via a photolithography process. That is, the organic material layer may be formed on the entire surface of the common electrode 160. Then, a portion of the organic material layer is exposed through a mask and etched to form the spacer 170. Here, the shape of the spacer 170 may be defined by the distance between the mask and the organic material layer and the amount of light exposure.

According to the present exemplary embodiment, the first and third color filters 120 and 140 overlap in the blocking area BA and the peripheral area 114, so that light is blocked in the blocking area BA and the peripheral area 114. Therefore, an additional light-blocking layer for blocking the light may be omitted and the process of manufacturing a color filter substrate 100 may be simplified.

As described above, the second color filter 130 is formed after the first color filter 120 is formed. Alternatively, the second color filter 130 may be formed before the first color filter 120 is formed. As a further alternative, the second color filter 130 may be formed after the third color filter 140 is formed.

Figure 11A:
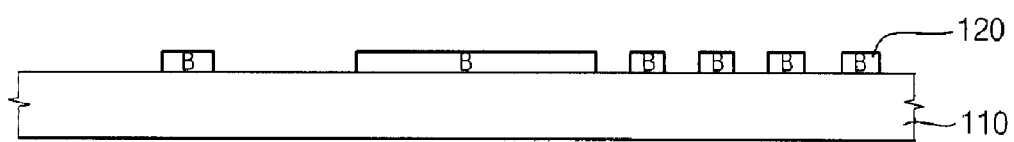
FIGS. 11A, 12A, 13A, 14, and 15 are cross-sectional views showing a method of manufacturing a color filter substrate according to another exemplary embodiment of the present invention.
Figure 11B:
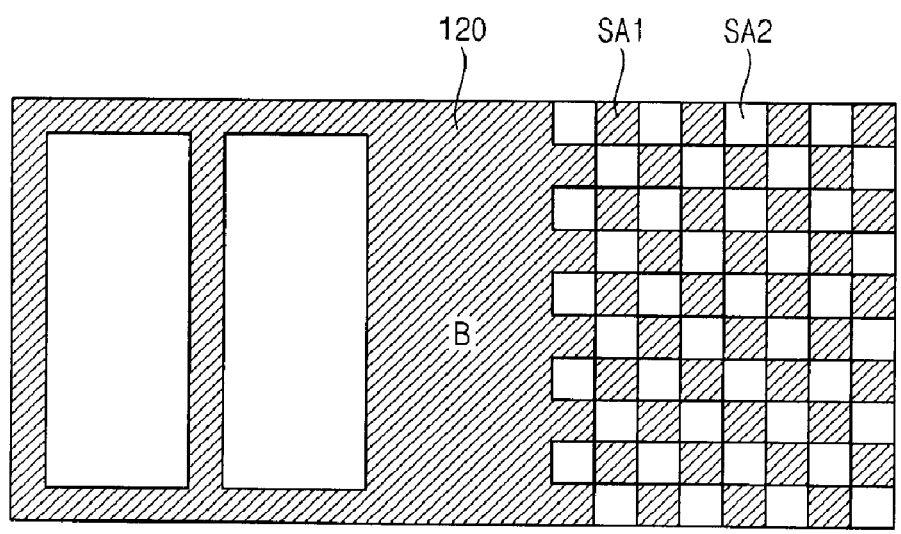
FIGS. 11B, 12B, and 13B are plan views showing a method of manufacturing a color filter substrate according to another exemplary embodiment of the present invention.
Figure 12A:
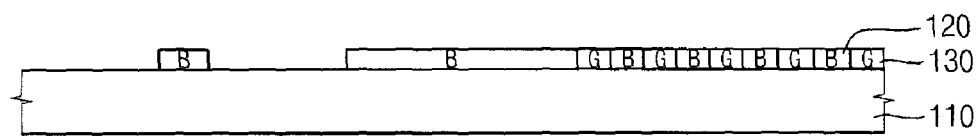
Figure 12B:
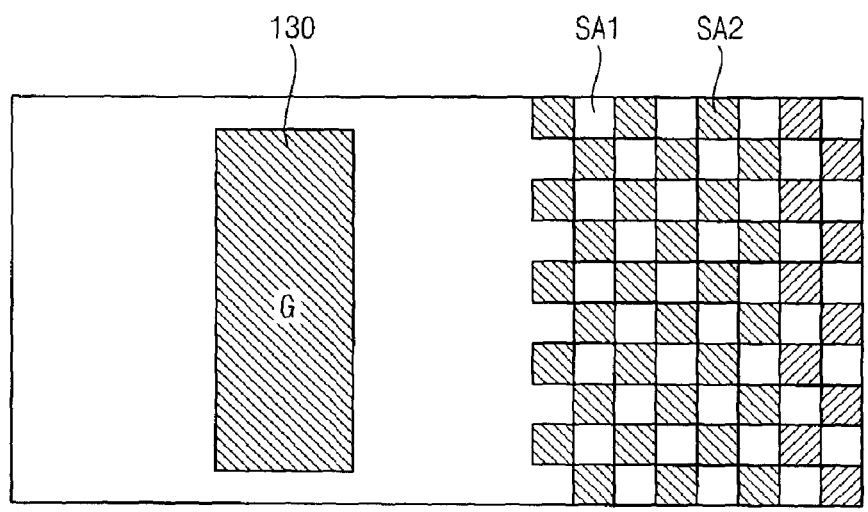
Figure 13A:
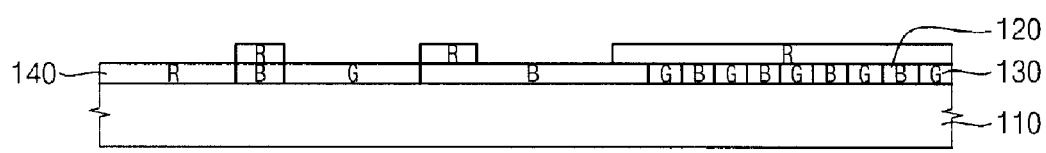
Figure 13B:
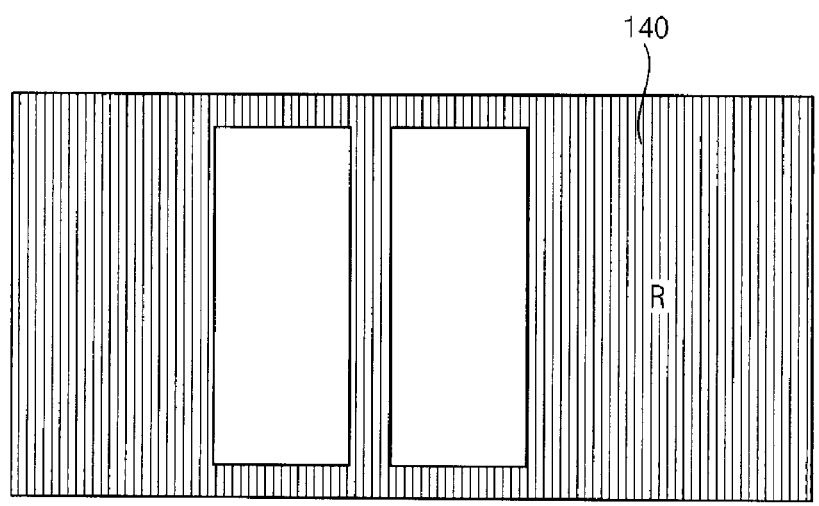

FIGS. 11A, 12A, 13A, 14, and 15 are cross-sectional views showing a method of manufacturing a color filter substrate according to another exemplary embodiment of the present invention, and FIGS. 11B, 12B, and 13B are plan views showing a method of manufacturing a color filter substrate according to another exemplary embodiment of the present invention. Hereinafter, the method of manufacturing a color filter substrate in accordance with the present exemplary embodiment will be described in detail with reference to the accompanying drawings.

FIG. 11A is a cross-sectional view showing a step of forming a first color filter on a base substrate, and FIG. 11B is a plan view showing the position in which the first color filter is formed.

Referring to FIGS. 4, 11A, and 11B, a base substrate 110 having a flat shape is prepared. The base substrate 110 includes a display region 112 for displaying an image and a peripheral region 114 that surrounds the peripheral portion of the display region 112. The display region 112 includes a pixel area PA and a blocking area BA. The pixel area PA includes is a first unit area PA1, a second unit area PA2, and a third unit area PA3 that are spaced apart from each other. The blocking area BA surrounds peripheral portions of each of the first, second, and third unit areas PA1, PA2, and PA3. The peripheral region 114 includes a first sub-area SA1 and a second sub-area SA2 that are disposed adjacent each other.

The first and second sub-areas SA1 and SA2 may be alternately arranged along a first direction, and alternately arranged along a second direction that is substantially perpendicular to the first direction. That is, the first and second sub-areas SA1 and SA2 may be arranged in a checkerboard pattern. Alternatively, the first and second sub-areas SA1 and SA2 may be arranged in alternating columns.

A first color filter 120 is formed on the base substrate 110. The first color filter 120 is formed in the first unit area PA1 and the blocking area BA. The first color filter 120 is further formed in the first sub-area SA1 of the peripheral region 114. For example, the first color filter 120 may be patterned via a photolithography process. The first color filter 120 may be a blue color filter or a red color filter.

FIG. 12A is a cross-sectional view showing a method of manufacturing a second color filter on a base substrate, and FIG. 12B is a plan view showing the position of the second color filter.

Referring to FIGS. 4, 12A, and 12B, the second color filter 130 is formed on the base substrate 110. The second color filter 130 is formed in the second unit area PA2 and in the second sub-area SA2 of the peripheral region 114. For example, the second color filter 130 may be patterned via a photolithography process. The second color filter 130 may be a green color filter.

FIG. 13A is a cross-sectional view showing a method of manufacturing a third color filter on a base substrate and on the first and second color filters, and FIG. 13B is a plan view showing the position of the third color filter.

Referring to FIGS. 4, 13A, and 13B, a third color filter 140 is formed on the base substrate 110 and on the first color filter 120 and the second color filter 130. Particularly, the third color filter 140 is formed in the third unit area PA3 and on the first color filter 120 in the blocking area BA. Moreover, the third color filter 140 is formed on the first and second color filters 120 and 130 in the peripheral region 114. For example, the third color filter 140 is patterned via a photolithography process. When the first color filter 120 is a blue color filter, the third color filter 140 may be a red color filter. Alternatively, when the first color filter 120 is a red color filter, the third color filter 140 may be a blue color filter.

Figure 14:
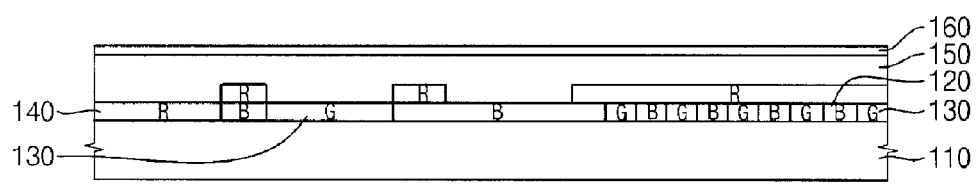

FIG. 14 is a cross-sectional view showing a method of manufacturing an overcoating layer and a common electrode.

Referring to FIG. 14, an overcoating layer 150 is formed on the first base substrate 110 to cover the first, second, and third color filters 120, 130, and 140. Then, the common electrode 160 is formed on the overcoating layer 150.

Figure 15:
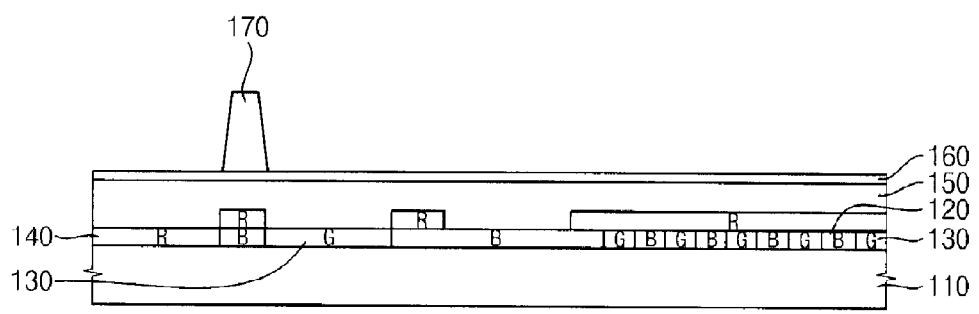

FIG. 15 is a cross-sectional view showing a method of manufacturing a spacer on a common electrode.

Referring to FIGS. 4 and 15, the spacer 170 is formed on the common electrode 160. The spacer 170 is formed at a position that corresponds to a portion of the blocking area BA. The spacer 170 may include an organic material and may be patterned via a photolithography process.

As described above, the second color filter 130 is formed after the first color filter 120 is formed. Alternatively, the second color filter 130 may be formed before the first color filter 120 is formed. FIGS. 16A, 17A, 18A, 19, and 20 are cross-sectional views showing a method of manufacturing a color filter substrate according to another exemplary embodiment of the present invention, and FIGS. 16B, 17B, and 18B are plan views showing a method of manufacturing a color filter substrate according to another exemplary embodiment of the present invention. Hereinafter, the method of manufacturing a color filter substrate in accordance with the present exemplary embodiment will be described in detail with reference to the accompanying drawings.

Figure 16A:
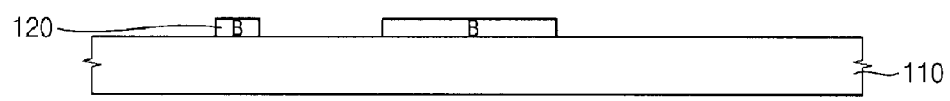
FIGS. 16A, 17A, 18A, 19, and 20 are cross-sectional views showing a method of manufacturing a color filter substrate according to another exemplary embodiment of the present invention.
Figure 16B:
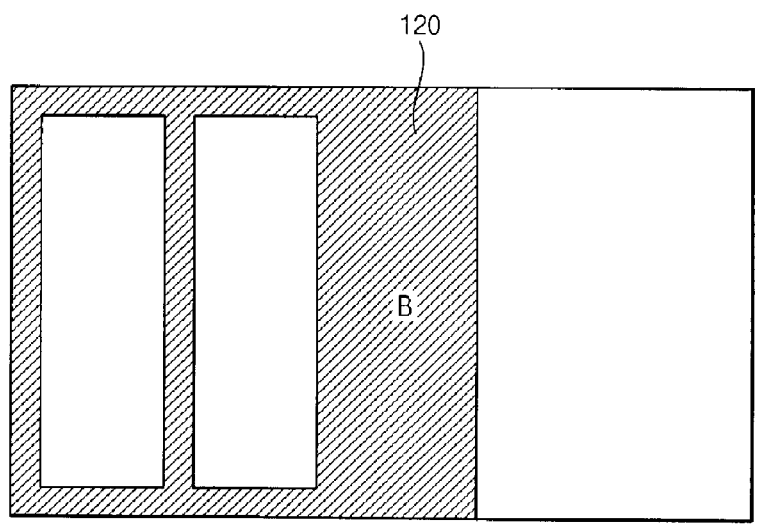
FIGS. 16B, 17B, and 18B are plan views showing a manufacturing method of a color filter substrate according to another exemplary embodiment of the present invention.

FIG. 16A is a cross-sectional view showing a step of forming a first color filter on a base substrate, and FIG. 16B is a plan view showing the position in which the first color filter is formed.

Referring to FIGS. 5, 16A, and 16B, a base substrate 110 having a flat shape is prepared. The base substrate 110 includes a display region 112 for displaying an image and a peripheral region 114 that surrounds the peripheral portion of the display region 112. The display region 112 includes a pixel area PA and a blocking area BA. The pixel area PA includes a first unit area PA1, a second unit area PA2, and a third unit area PA3 that are spaced apart from each other. The blocking area BA surrounds peripheral portions of each of the first, second, and third unit areas PA1, PA2, and PA3.

Then, a first color filter 120 is formed on the base substrate 110. The first color filter 120 is formed in the first unit area PA1 of the pixel area PA and the blocking area BA. For example, the first color filter 120 may be patterned via a photolithography process. The first color filter 120 may be a blue color filter or a red color filter.

Figure 17A:
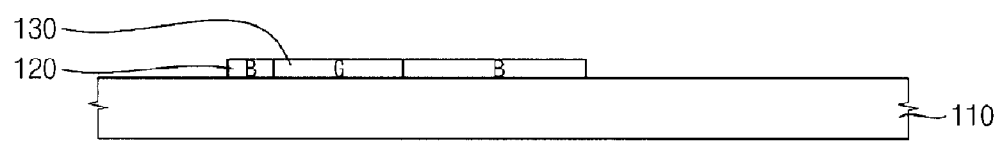
Figure 17B:
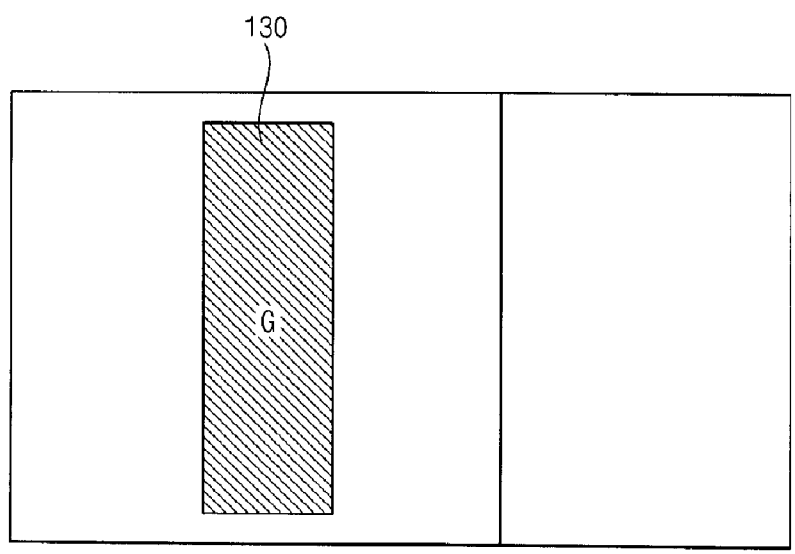

FIG. 17A is a cross-sectional view showing a method of manufacturing a second color filter on a base substrate, and FIG. 17B is a plan view showing the position of the second color filter.

Referring to FIGS. 5, 17A, and 17B, the second color filter 130 is formed on the base substrate 110. The second color filter 130 is formed in the second unit area PA2 of the pixel area PA. For example, the second color filter 130 may be patterned via a photolithography process. The second color filter 130 may be a green color filter.

Figure 18A:
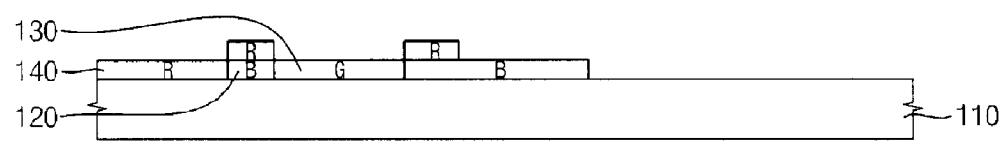
Figure 18B:
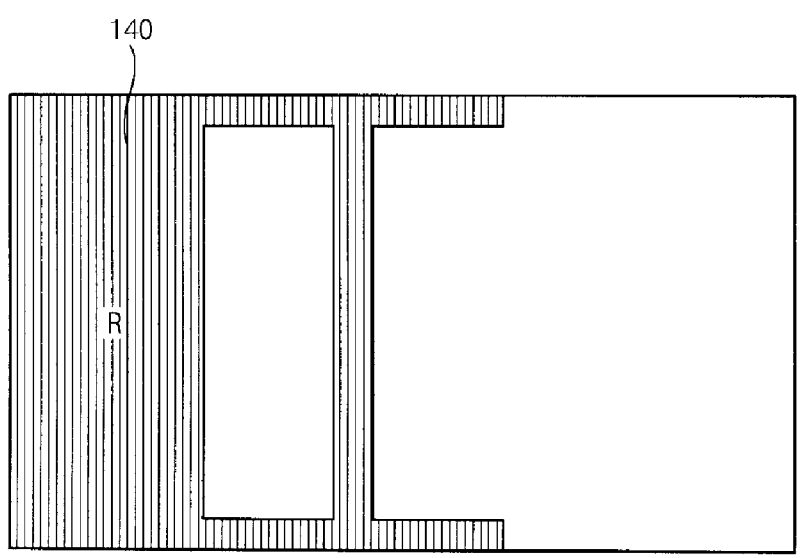

FIG. 18A is a cross-sectional view showing a method of manufacturing a third color filter on a base substrate and on a first color filter, and FIG. 18B is a plan view showing the position of the third color filter.

Referring to FIGS. 3, 18A, and 18B, a third color filter 140 is formed on the base substrate 110 and on the first color filter 120. Particularly, the third color filter 140 is formed in the third unit area PA3 of the pixel area PA and on the first color filter 120 in the blocking area BA. For example, the third color filter 140 is patterned via a photolithography process. When the first color filter 120 is a blue color filter, the third color filter 140 is a red color filter. Alternatively, when the first color filter 120 is a red color filter, the third color filter 140 is a blue color filter.

Figure 19:
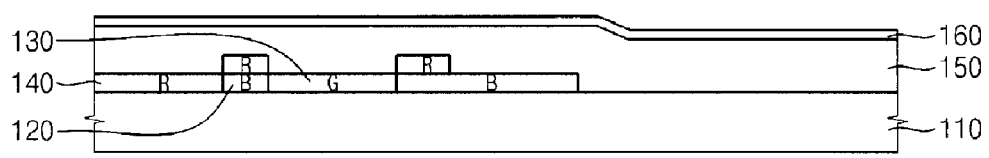

FIG. 19 is a cross-sectional view showing a method of manufacturing an overcoating layer and a common electrode.

Referring to FIG. 19, an overcoating layer 150 is formed on the first base substrate 110 to cover the first, second, and third color filters 120, 130, and 140. Then, the common electrode 160 is formed on the overcoating layer 150.

Figure 20:
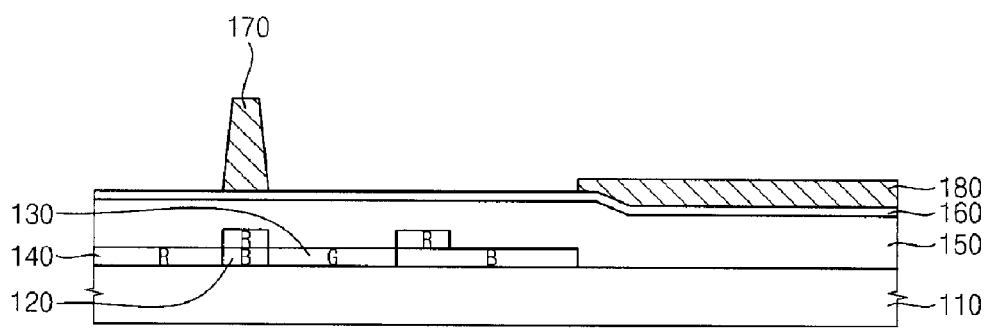

FIG. 20 is a cross-sectional view showing a method of manufacturing a spacer and a peripheral-region blocking member on a common electrode.

Referring to FIGS. 5 and 20, the spacer 170 and the peripheral-region-blocking member 180 are simultaneously formed on the common electrode 160. The spacer 170 is formed at a position that corresponds to a portion of the blocking area BA. The peripheral-region-blocking member 180 is formed at a position that corresponds to the peripheral region 114. The spacer 170 and the peripheral-region-blocking member 180 may include a material that blocks light, such as a black organic material.

A process for forming the spacer 170 and the peripheral-region-blocking member 180 is described below. An organic material layer having a black color that blocks light is formed on the entire surface of the common electrode 160. Then, a portion of the organic material layer is exposed through a mask and etched to simultaneously form the spacer 170 and the peripheral-region-blocking member 180. Here, the shape of the spacer 170 and the peripheral-region-blocking member 180 may be defined by the size of a slit in the mask, the distance between the mask and the organic material layer, and the amount of light exposure.

As described above, the second color filter 130 is formed after the first color filter 120 is formed. Alternatively, the second color filter 130 may be formed before the first color filter 120 is formed. As a further alternative, the second color filter 130 may be formed after the third color filter 140 is formed.

According to an exemplary embodiment of the present invention, blue and red color filters overlap in a blocking area of a display area, so that light is blocked in the blocking area. Furthermore, blue and red color filters overlap in a peripheral area, or a peripheral region-blocking member including a material that blocks light is formed in the peripheral area, so that light is blocked in the peripheral area. As a result, an additional light-blocking layer for blocking the light may be omitted, which may simplify the manufacturing process of the color filter substrate.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display substrate, comprising:
a base substrate comprising a display region and a peripheral region surrounding the display region, the display region comprising a pixel area having a first unit area, a second unit area, and a third unit area that are disposed adjacent to each other, and a blocking area that surrounds each of the first unit area, the second unit area, and the third unit area;
a first color filter disposed in the first unit area and the blocking area;
a second color filter disposed in the second unit area; and
a third color filter disposed in the third unit area and on the first color filter in the blocking area,
wherein the peripheral region comprises a first sub-area and a second sub-area disposed adjacent to each other,
the first color filter is further disposed in the first sub-area, the second color filter is further disposed in the second sub-area, and the third color filter is further disposed directly on the first color filter and directly on the second color filter in the peripheral region, and
the third color filter covers all of the first color filter and the second color filter in the peripheral region.

2. The display substrate of claim 1, wherein the second color filter is a green color filter, one of the first color filter and the third color filter is a blue color filter, and the other of the first color filter and the third color filter is a red color filter.

3. The display substrate of claim 1, wherein the first sub-area and the second sub-area are alternately arranged in a first direction and are alternately arranged in a second direction substantially perpendicular to the first direction.

4. The display substrate of claim 2, further comprising:
an overcoating layer disposed on the base substrate to cover the first color filter, the second color filter, and the third color filter;
a common electrode disposed on the overcoating layer; and
a spacer disposed on the common electrode to correspond to a portion of the blocking area.

5. The display substrate of claim 1, further comprising:
a plurality of thin-film transistors (TFTs) formed on the first to third pixel areas, respectively; and
a plurality of pixel electrodes electrically connected to the TFTs, respectively, wherein the TFTs are interposed between the base substrate and the first to third color filters.

6. A display panel, comprising:
a color filter substrate comprising a base substrate, a first color filter, a second color filter, and a third color filter,
the base substrate comprising a display region and a peripheral region surrounding the display region, the display region comprising a pixel area having a first unit area, a second unit area, and a third unit area that are disposed adjacent to each other, and a blocking area that surrounds each of the first unit area, the second unit area, and the third unit area,
the first color filter being disposed in the first unit area and the blocking area,
the second color filter being disposed in the second unit area, and
the third color filter being disposed in the third unit area and on the first color filter in the blocking area;
an array substrate disposed to face the color filter substrate, the array substrate comprising a plurality of thin-film transistors and a plurality of pixel electrodes connected to the thin film transistors; and
a liquid crystal layer interposed between the array substrate and the color filter substrate,
wherein the peripheral region comprises a first sub-area and a second sub-area that are arranged adjacent to each other,
the first color filter is further disposed in the first sub-area, the second color filter is further disposed in the second sub-area, and the third color filter is further disposed directly on the first color filter and directly on the second color filter in the peripheral region, and
the third color filter covers all of the first color filter and the second color filter in the peripheral region.

7. The display panel of claim 6, wherein the second color filter is a green color filter, one of the first color filter and the third color filter is a blue color filter, and the other of the first color filter and the third color filter is a red color filter.

8. A display panel, comprising:
- a first substrate;
- a second substrate facing the first substrate, the second substrate comprising a base substrate, a plurality of thin-film transistors (TFTs), a plurality of pixel electrodes, a first color filter, a second color filter, a third color filter,
  - the base substrate comprising a display region and a peripheral region surrounding the display region, the display region comprising a pixel area having a first unit area, a second unit area, and a third unit area that are disposed adjacent to each other, and a blocking area that surrounds each of the first to third unit areas,
  - the TFTs being respectively disposed in each of the first to third pixel areas,
  - the pixel electrodes being electrically connected to the TFTs, respectively,
  - the first color filter being disposed in the first unit area and the blocking area,
  - the second color filter being disposed in the second unit area, and
  - the third color filter being disposed in the third unit area and on the first color filter in the blocking area; and
- a liquid crystal layer interposed between the first substrate and the second substrate,
- wherein the peripheral region comprises a first sub-area and a second sub-area that are arranged adjacent to each other,
- the first color filter is further formed in the first sub-area, the second color filter is further formed in the second sub-area, and the third color filter is further formed directly on the first color filter and directly on the second color filter in the peripheral region, and
- the third color filter covers all of the first color filter and the second color filter in the peripheral region.

9. A method for manufacturing a display substrate comprising a display region and a peripheral region surrounding the display region, the display region comprising a pixel area having a first unit area, a second unit area, and a third unit area that are disposed adjacent to each other, and a blocking area that surrounds each of the first unit area, the second unit area, and the third unit area, the method comprising:
- preparing a base substrate;
- forming a first color filter on the first unit area and the blocking area;
- forming a second color filter on the second unit area; and
- forming a third color filter on the third unit area and on the first color filter in the blocking area,
- wherein the peripheral region comprises a first sub-area and a second sub-area that are arranged adjacent to each other,
- the first color filter is further formed in the first sub-area, the second color filter is further formed in the second sub-area, and the third color filter is further formed directly on the first color filter and directly on the second color filter in the peripheral region, and
- the third color filter covers all of the first color filter and the second color filter in the peripheral region.

10. The method of claim 9, wherein the second color filter is a green color filter, one of the first color filter and the third color filter is a blue color filter, and the other of the first color filter and the third color filter is a red color filter.

* * * * *